United States Patent [19]

Horvath

[11] Patent Number: 5,133,854
[45] Date of Patent: Jul. 28, 1992

[54] SKIMMER WITH SELF-ADJUSTING FLOATING COLLECTOR

[76] Inventor: Tibor Horvath, 6 Hemlock Ter., Springfield, N.J. 07081

[21] Appl. No.: 552,306

[22] Filed: Jul. 13, 1990

[51] Int. Cl.⁵ .............................................. B01D 35/05
[52] U.S. Cl. ...................................... 210/121; 210/169; 210/242.1; 210/416.2; 15/1.7; 4/490
[58] Field of Search ............... 210/130, 169, 416.2, 210/242.1, 242.3, 923, 121; 15/1.7; 4/490

[56] References Cited

U.S. PATENT DOCUMENTS

| | | | |
|---|---|---|---|
| 2,989,185 | 6/1961 | Lombardi | 210/169 |
| 3,186,550 | 6/1965 | Beduhn | 210/169 |
| 3,268,079 | 8/1966 | Sharrow | 210/169 |
| 3,303,932 | 2/1967 | Hirs et al. | 210/242.1 |
| 3,402,817 | 9/1968 | Dovel | 210/169 |
| 3,633,749 | 1/1972 | Panosh | 210/169 |
| 3,843,520 | 10/1974 | Bottorf | 210/242.1 |
| 3,970,556 | 7/1976 | Gore | 210/242.1 |
| 4,032,449 | 6/1977 | De Visser et al. | 210/242.1 |
| 4,094,338 | 6/1978 | Bauer | 210/242.1 |
| 4,626,358 | 12/1986 | Fetsko | 210/923 |
| 4,746,424 | 5/1988 | Drew | 210/169 |
| 4,781,827 | 11/1988 | Shields | 210/169 |
| 4,802,592 | 2/1989 | Wessels | 210/169 |
| 4,900,432 | 2/1990 | Arnold et al. | 210/169 |

Primary Examiner—Peter Hruskoci
Assistant Examiner—Robert James Popovics
Attorney, Agent, or Firm—Howard C. Miskin

[57] ABSTRACT

An apparatus for skimming the surface of body of liquid includes a hollow support member and an tubular collector member having a top opening and vertically slidable in the support member and connected to the suction input of a centrifugal pump. The support member either floats in the liquid body or is supported on the floor of the liquid body and is at a level that, in the dormant condition of the apparatus, the collector member opening is slightly above the liquid surface. Upon actuation of the pump, the suction lowers the collector member and draws the surface water over the edge of the collector member which may be covered by a filter bag for retaining debris.

10 Claims, 4 Drawing Sheets

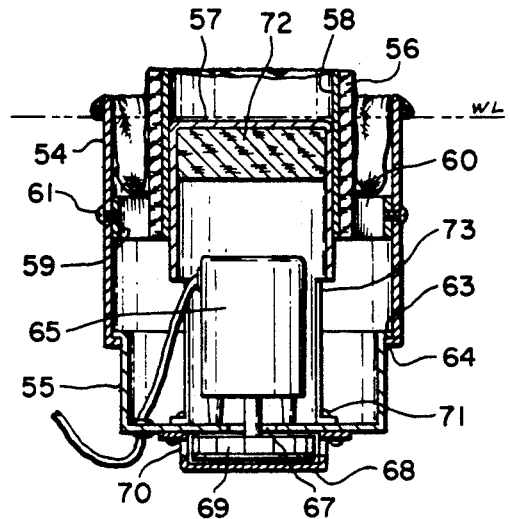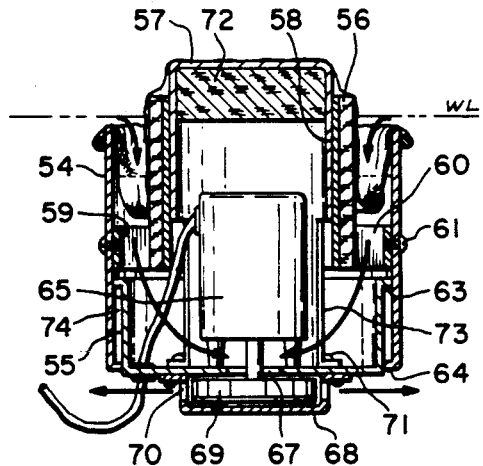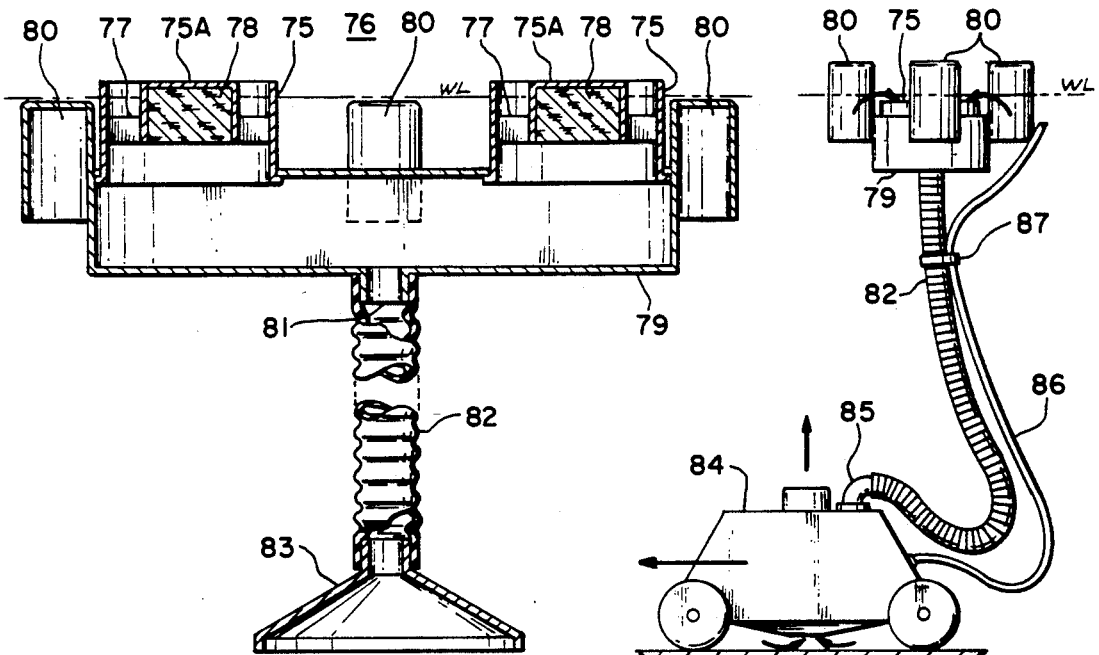

SKIMMER WITH SELF-ADJUSTING FLOATING COLLECTOR

BACKGROUND OF THE INVENTION

The present invention relates generally to improvements in cleaning devices and it relates particularly to an improved apparatus for skimming the surface of a liquid to remove solid or foreign liquid materials floating on the liquid surface.

The skimming apparatus in a swimming pool is generally part of the filtration system and conventionally consists of an opening at the upper edge of the pool in the area of the filtration system intake. This opening is approximately 15 to 20 inches wide. Behind the opening is a circular receiver well connected to the suction end of a pump. Because this receiving well gets the water flow from only one side through the aforesaid opening, the column of water entering this opening must be several inches high to eliminate air getting sucked into the pump, the stronger the pump, the higher the water column must be. This results in a very inefficient skimming of the pool and, if the water level is too high, the skimming efficiency drops even further and may reach zero if the water level is higher than the ceiling of the aforesaid opening. Moreover, these filter pumps are very costly to operate.

Thus, not only are the conventional pool skimming systems highly inefficient and of limited effectiveness and costly and expensive to operate but they are of little adaptability and versatility and otherwise leave much to be desired.

SUMMARY OF THE INVENTION

It is a principal object of the present invention to provide an improved liquid cleaning apparatus.

Another object of the present invention is to provide an improved liquid skimming apparatus.

Still another object of the present invention is to provide an improved apparatus for skimming the surface of a body of liquid independently of the filtering apparatus associated with the body of liquid.

A further object of the present invention is to provide an improved liquid surface skimming apparatus of the above nature which is compact, self-contained, rugged, highly efficient, inexpensive and of great versatility and adaptability.

The above and other objects of the present invention will become apparent from a reading of the following description taken in conjunction with the accompanying drawings which illustrate preferred embodiments thereof.

A skimming apparatus in accordance with the present invention includes a buoyant collector member having an inlet at its top and an outlet at its bottom communicating through the collector member with the inlet. The collector outlet is telescopically connected to a suction source such as the inlet to a centrifugal pump and the collector is supported for vertical movement and responds in elevation to the level of liquid inside the collector so that, in its rest position, when the liquid levels inside and outside the collector are the same, the collector inlet is above the liquid surface level and, with the application of suction to effect the flow of liquid through and from the collector, the collector is lowered under the influence of the lowered liquid level inside the collector to bring the collector inlet to below the liquid surface level which is outside of the collector. In its preferred form, the collector inlet is engaged by a pliable filter member which sags into the collector inlet. The collector support may be mounted on the bottom of the body of the liquid or may be a buoyant vessel, floating in the liquid.

The improved skimming apparatus, when employed in a swimming pool or any other body of water where it is designed to separate and remove solid or liquid material from its surface, operates independently of any other equipment associated with the body of liquid. It collects the water in a 360 degree span and automatically adjust to the water level and to the power of the suction pump to skim the thinnest possible layer of the water surface, thus providing the most efficient skimming operation. Since the suction pump in the present skimming apparatus only has to move the water, not filter it under high pressure, the cost of operation is only a fraction of that of the conventional filter system. Also, the above conventional system requires a trap door placed in the opening to prevent debris from returning to the pool.

The apparatus of the present invention is simple, rugged, reliable, highly efficient, highly mobile, and of great versatility and adaptability.

BRIEF DESCRIPTION OF THE DRAWINGS

FIGS. 5 and 6 are views similar to FIGS. 3 and 4 respectively of still another embodiment of the floating apparatus of the present invention;

FIG. 7 is a front elevational view partially in section of another embodiment of the present invention shown in a dormant state;

FIG. 8 is a side elevational view of the apparatus shown in FIG. 7, illustrated attached to a suction pump and operational;

DESCRIPTION OF THE PREFERRED EMBODIMENTS

Figure 1:
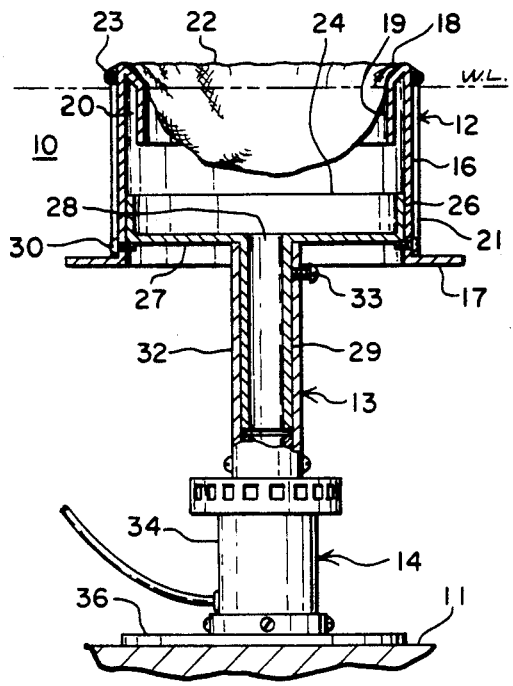
FIG. 1 is a front elevational view, partially in section, of a preferred embodiment of the present invention, shown in a dormant state and base supported.
Figure 2:
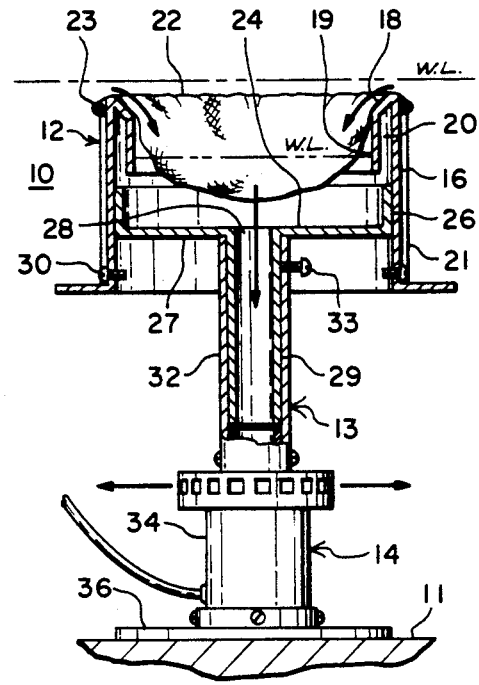
FIG. 2 is a view similar to FIG. 1 but with the apparatus shown in an operating condition.

Referring now to the drawings, particularly FIGS. 1 and 2 thereof which illustrate a preferred embodiment of the present invention, the reference number 10 generally designates the improved apparatus which is shown mounted on the bottom 11 of a swimming pool whose top surface at level W.L. is to be skimmed. Apparatus 10 comprises a collector member 12, a support assembly 13 and an electric motor driven centrifugal pump 14.

The collector member 12 is of circular open ended cylindrical tubular configuration and includes a vertical peripheral wall 16 terminating at its bottom in an outwardly directed annular flange 17 and at its top in an inwardly downwardly inclined flange 18 joining a depending coaxial cylindrical wall 19 which defines, with flange 18 and wall 16, an open bottom air-containing floatation chamber 20 which imparts buoyancy to collector member 12. Peripherally spaced vertical ribs 21 are formed on the outside face of wall 16 and terminate below the top of wall 16. A flexible pliable filter bag or cloth 22 engages the top end of ribs 21.

The support assembly 13 includes an open topped support member 24 having a low peripheral cylindrical wall 26 slidably telescoping the bottom portion of collector peripheral wall 16 and having a bottom wall 27 with a central opening 28. A vertical tube 29 depends from wall 27 in registry with opening 28. Stop defining screw 30 engages the lower border of collector wall 16 and projects into vertical projection of support member 24 to limit the upward movement of collector member 12.

A tubular vertical post 32 is vertically adjustably telescoped by tube 29 and is fixed thereto in an adjusted position by a set screw 33. Post 32 is coaxially mounted atop centrifugal pump 14 and communicates with the axial top suction inlet part thereof, the electric drive motor 34 of pump 14 being secured to an enlarged disc-shaped base 36 which rests on the tank or pool floor 11.

In the operation of the improved skimming apparatus 10, the base 36 rests on the pool floor 11, the height of pipe 29 in post 32 being adjusted so that, in the dormant condition of apparatus 10 with pump motor 34 unenergized, the top edge of collector member 12 is shortly above the liquid level water level top surface W.L.

When pump motor 34 is turned on and pump 14 energized, the water level which supports collector member 12 drops, lowering the collector member 12 so that its upper edge falls below the water level which is outside of collector member 12. The stronger the pump suction, the lower the water level inside the collector, thus, the further down the collector member 12 will drop, allowing more water to flow into it. If collector member 12 drops too low, the excess water lifts the collector member which in turn reduces the water flow into it. This causes an initial vertical oscillation of collector member 12, outer flange 17 functioning as a damper to reduce or eliminate this effect.

When pump 14 is deenergized, the collector fills with water initially from the top then from within, raising collector member 12 above the outer water level, thus preventing any debris from returning to the surrounding water.

The weight of pump 14 and base 36 keep the upward water pressure from raising support assembly 13.

Figure 3:
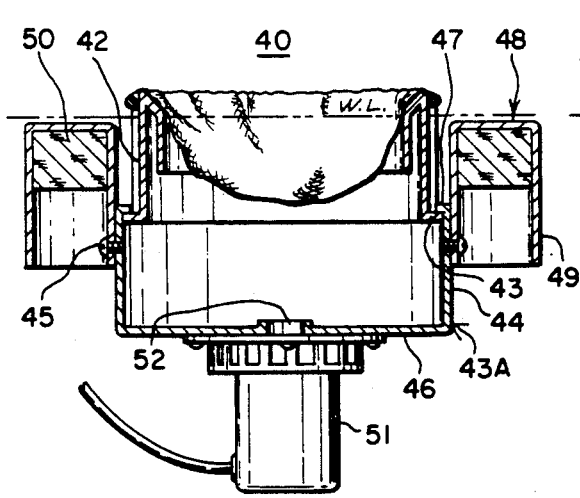
FIGS. 3 and 4 are views similar to FIGS. 1 and 2 showing another embodiment of the present invention with the apparatus being supported in a floating condition.
Figure 4:
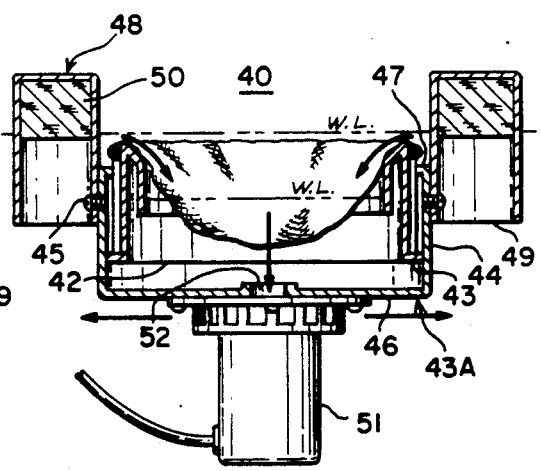

The apparatus 40 illustrated in FIGS. 3 and 4 differs from that shown in FIGS. 1 and 2 primarily in that it floats in the water whose surface is to be skimmed instead of resting on the pool bottom. Specifically, the collector member 42 is similar in construction to collector member 12 and carries a filter member corresponding to filter member 22. The bottom edge of collector member 42 terminates in an outer stop defining peripheral flange 43.

Collector member 42 is vertically movably engaged by hollow support cylinder or intake cup 43A which is open at its top and includes a cylindrical peripheral wall 44 and a centrally apertured bottom wall 46. Collector member flange 43 slidably engages the inside face of wall 44 and the upward movement of collector member 42 is limited by an inwardly directed peripheral flange 47 along the top edge of wall 44.

A plurality of regularly peripherally spaced balancing floats 48 are swivelably mounted by screws 45 to the outside face of and project above the wall 44. Each float 48 includes a cup-shaped hollow cylinder 49 open at its bottom and closed at its top and securely housing in its upper portion a buoyant member 50 which may be formed of a foamed plastic or the like.

An electric motor driven pump 51, similar to pump 14, coaxially depends from and is secured to wall 46. The suction inlet port of pump 51 communicates with the central opening 52 in bottom wall 46.

Considering the operation of apparatus 40, when pump 5 is turned on, collector member 42 drops and skimming occurs as described above. However, since the weight of pump assembly 51 is not overly heavy as in the apparatus of FIGS. 1 and 2, the upward water pressure due to its displacement inside collector member 42 lifts intake cup 43A which in turn raises balance floats 48 partially above the water level until the mass above the water level equals the mass of water that is missing inside collector member 42 between the inner and outer water levels.

In this embodiment, as in all others, oscillation can be controlled by adjusting the rate of pumping. Balance cups 44 are tilted at least 90 degrees left or right to fill any existing cavities with water. In skimming, the longer the edge along which the water flows into the skimmer, the thinner the layer of water which can be skimmed, providing water flow is constant. It is not the volume size of the skimmer that is important. Thus, in this respect, the significant part of the collecting member is its upper edge which is its outer diameter. Allowing about an inch inside the collecting member peripheral wall for the water to flow down, the rest of the collector member towards its middle is of little significance unless it is considered an enhancement to the collector's debris-holding capacity. In fact, this large so-called "useless" area necessitates the use of larger floats or balance cups.

Thus, in FIGS. 5 and 6, which illustrate another embodiment of the present invention, the middle section of collector member 54 is put to good use by locating both the cylindrical lifting sleeve 56 and support or balance cup 57 at this position. Lifting sleeve 56 is attached to telescoping inner sleeve 58 which is supported by ring 59 through a plurality of radial arms 60 regularly peripherally spaced. Ring 59 is secured to collector member 54 by fasteners 61. A slide cup 55 vertically slidably engages collector member 54 by way of an external flange 63 on cup 55 and inner flange 64 on collector member 54. A pump motor 65 is mounted inside of cup 55 so that its shaft 46 extends through a hole 67 into impeller housing 68 depending from the bottom wall of cup 55. An impeller 69 pumps water through apertures 70 in housing 68 which are equally peripherally spaced.

Balance cup 57 is also attached to cup 55 by fasteners 71 encircling motor 65. The upper end of balance cup 57 is at least partially filled with buoyant material 72 to offset the weight of motor 65, while its lower end is provided with a number of regularly peripherally spaced openings 73.

In operation, pump motor 65 is energized, collector member 54, and the components attached to it drop down while balancing cup 57, and the components attached to it rise until a balance between the two water levels is reached. Oscillation may be controlled by correct sizing of flanges 63 and 64 to allow proper water flow in and out of the chamber 74 occurring between the walls of collector 54 and intake cup 55.

The skimming apparatus last described skims in a 360 degree uninterrupted span without any obstruction, such as a number of balance cups or floats surrounding it, which could catch long slimy flexible debris. As stated earlier, the longer the edge over which the water drops into this skimmer, the better.

In FIGS. 7 and 8 of the drawings, there is illustrated another embodiment of the present invention in which the improved skimming apparatus 76 differs from those earlier described in that a single buoyant support chamber carries a plurality of collector members, for example two, which are connected to a suction pump which acts as a suction manifold. Specifically, the illustrated apparatus 76, instead of one large diameter collector member there are provided two half size collector members 75, providing the same size skimming perimeter as one which is twice in diameter, thus eliminating the need for large balance cups. To further reduce the size of the buoyant balance cups, a buoyant lifting cup 75A is mounted in the middle of each collector member 75 by radial arms 77 which are equally spaced in a 360 degree span. Each lifting cup 75A is filled with buoyant material 78. Each collector member 75 is vertically slidably mounted in an intake manifold or plenum 79 which has a plurality of buoyant balance cups 80 mounted on its periphery. The middle of manifold 79 has a depending central outlet pipe 81 onto which one end of flexible hose 82 is attached. The other end of hose 82 is affixed to a depending cone-shaped hood or cover 83. When cover 83 is placed over a drain or skimmer well of a swimming pool and its pump is turned on, collector members 75 drop down while balance cups 80 with manifold 79 rise and skimming in the previously described manner is effected. Although a swimming pool has its own skimmer, using the above method to skim its water is much faster and, therefore, more efficient. In the arrangement shown in FIG. 8, the last described apparatus is coupled to the water suction inlet of a swimming pool cleaning robot 84 by the flexible conduit 82 and a swiveling elbow 85, and line cord 86 is attached to flexible conduit or hose 82 by a clamp 87 to avoid tangling. An additional benefit, with the last arrangement, is that the skimming apparatus moves around the pool. In this and the above method of skimming there is no need for a filter cloth to be placed on collectors 75.

Figure 9:
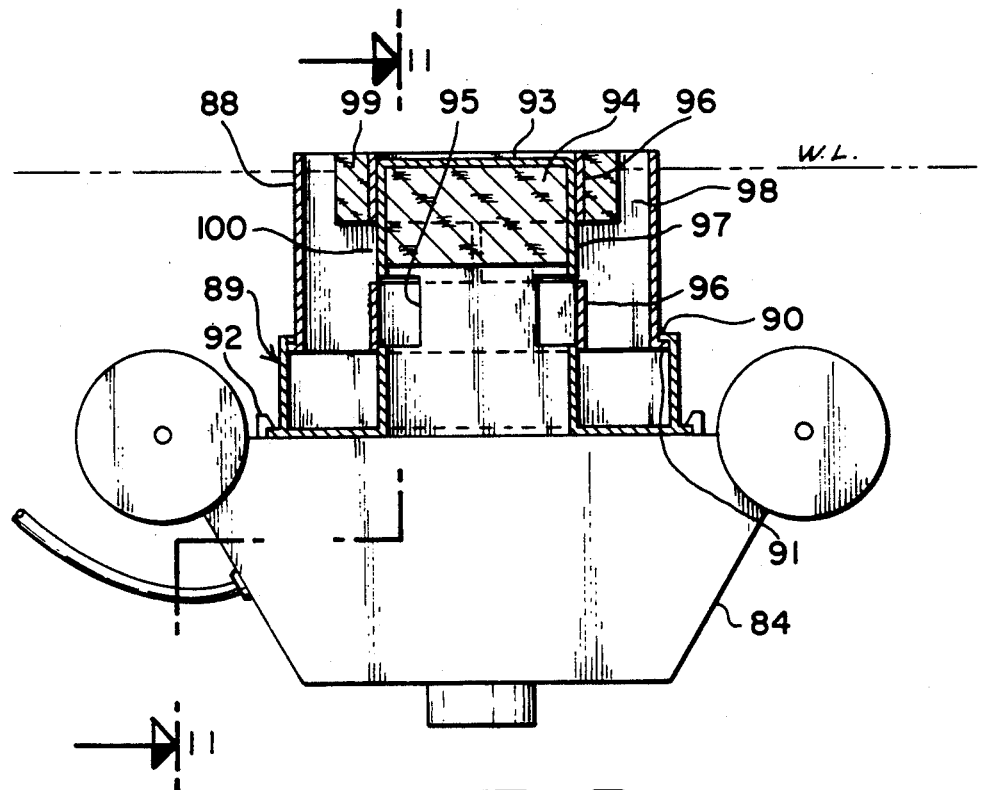
FIG. 9 is a front elevational view of a further embodiment of the present invention illustrated afloat and dormant and supporting a suction pump.
Figure 10:
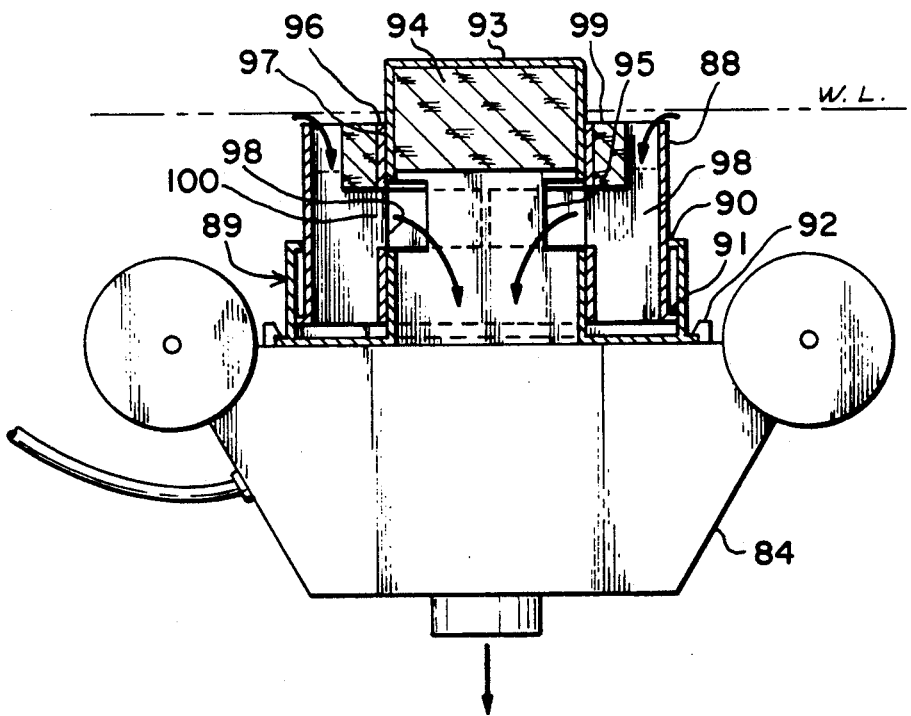
FIG. 10 is a view similar to FIG. 9 with the apparatus shown in operation.
Figure 11:
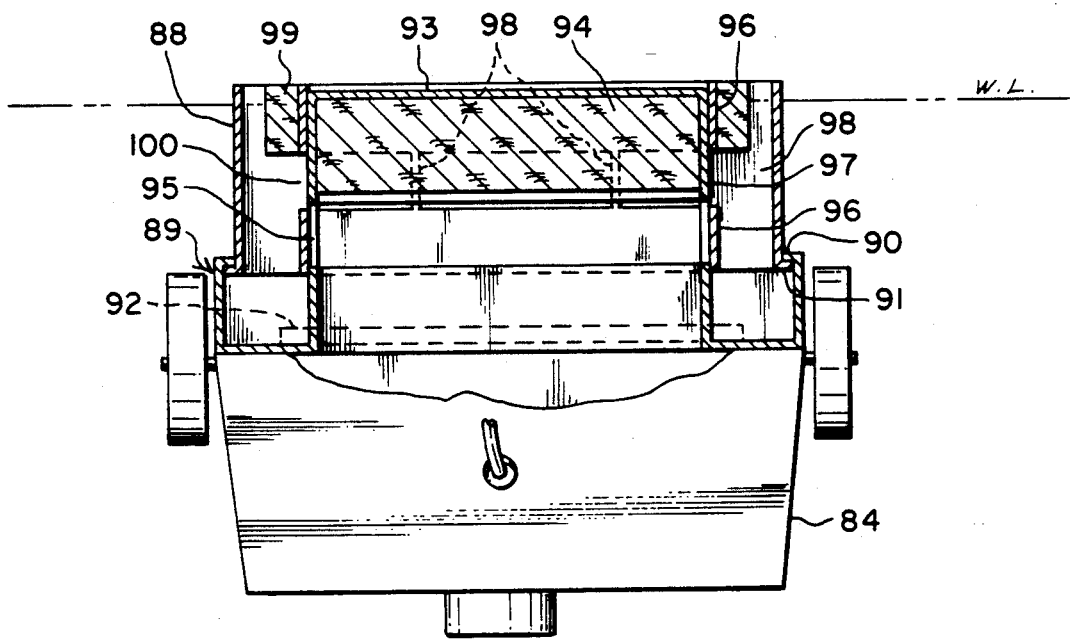
FIG. 11 is a sectional view along line 11—11 in FIG. 9.

Referring now to FIGS. 9 and 10 of the drawings which illustrate a further embodiment of the present invention which is of the buoyant type and which is shaped to facilitate its attachment to and use with a robot water suction pump device 84 of known construction. Specifically, a sleeve or collector member 88 and the other associated components of the skimming apparatus are of rectangular configuration to facilitate its attachment to the robot device 84. A rectangular sleeve mount member 89 has a vertical outside wall vertically slidably engaged by collector member 88 and has an inwardly directed top flange 90 lying in the vertical path of lower bottom outwardly directed flange 91 on collector member 88. The collector assembly is snap coupled to the bottom of inverted robot pump device 84 by flexible hook-shaped tabs 92 on the bottom of robot device 84 engaging an outwardly projecting flange on the bottom of mount member 89. Mount member 89 includes a rectangular coaxial vertical inside wall 97 longer than the height of the collector member 88 and peripherally spaced openings 95 are formed in the inside wall. A top wall 93 closes the top of the mount member inside wall to form a receptacle housing a plastic buoyant body 94 to define a float. Collector member 88 has an inside sleeve wall 96 slidably engaging the outside face of the mount member inside sleeve wall 97 and has gate openings 100 formed therein, the mount member inside wall including vertically spaced rectangular upper and lower sleeves which delineate openings 100. When collector member 88 descends, openings 95 and 100 are in registry, providing communication between the collector member and pump inlet as shown by the arrows in FIG. 10. As shown in FIG. 9, when the collector member 88 rises, the openings 95 and 100 are out of registry to block communication between the collector member and the pump inlet. The collector inner sleeves 96 are connected to each other and to the outer wall of collector member 88 by peripherally spaced vertical ribs 98. The buoyancy of the skimming apparatus is further increased by a buoyant lifting ring 99 surrounding and affixed to the upper outside face of collector upper sleeve.

In operation, upon the activation of robot pump 84, due to the approximate closure of opening 100, as aforesaid, a small amount of water is allowed to flow through the skimmer apparatus. However, as collector member 88 descends and mount member 89 relatively rises, the flow of water slowly increases to its maximum and the gradual resulting movement eliminates any chance of oscillation which could be caused by a sudden jolt of water flow.

While there have been described and illustrated preferred embodiments of the present invention, it is apparent that numerous additions, alterations and omissions may be made without departing from the spirit thereof. The apparatus, while particularly suited for the skimming of swimming pools, may be applied to the skimming of the surfaces of other bodies of liquid material, domestic, industrial or commercial.

I claim:

1. An apparatus for skimming the surface of a liquid comprising a collector member having an inlet and an outlet in fluid communication with said inlet and including a vertical hollow cylindrical peripheral wall, a filter receptacle registering with said collector member inlet, means for supporting said collector including a cylindrical supporting member slidably telescopically engaging said collector member cylindrical peripheral wall and delineating with said collector member cylindrical wall and filter receptacle a variable volume suction chamber, a pump for applying suction to said variable volume suction chamber to draw liquid through said collector member and said variable volume suction chamber, said support means in the absence of said suction, supporting said collector member with said inlet above said liquid surface and with the application of said suction lowering said collector member to a position with said inlet below said liquid surface, said supporting means including an annular flotation member surrounding and secured to said cylindrical support member and including a cylindrical peripheral wall and a bottom end wall having a bottom opening, said suction applying means including a suction pump depending from and secured to said end wall and having an inlet in fluid communication with said bottom opening.

2. An apparatus for skimming the surface of a liquid comprising a collector member having an inlet and an outlet in fluid communication with said inlet and including a vertical hollow cylindrical peripheral wall, a filter receptacle registering with said collector member inlet, means for supporting said collector including a cylindrical supporting member slidable telescopically engaging said collector member cylindrical peripheral wall and delineating with said collector member cylindrical wall and filter receptacle a variable volume suction chamber, a pump for applying suction to said variable volume suction chamber to draw liquid through said collector member and said variable volume suction chamber, said support means in the absence of said suction, supporting said collector member with said inlet above said liquid surface and with the application of said suction, lowering said collector member to a position with said inlet below said liquid surface, said cylindrical supporting member being open ended and coaxial with and secured to and radially spaced from said collector member and said supporting means including a hollow cylinder comprising a cylindrical flange and a bottom wall with a central opening slidably engaging said cylindrical supporting member and being in fluid communication with said pump.

3. The apparatus of claim 2 wherein, said pump includes an electric motor mounted atop said bracket bottom wall and including a drive shaft and an impeller located below said bottom wall, and connected to said drive shaft.

4. An apparatus for skimming the surface of a liquid comprising a collector member including an inlet and an outlet communicating with said inlet, means for applying suction to said outlet to draw liquid into said inlet and through said outlet and means for supporting said collector member responsive to said suction for varying the elevation of said inlet relative to the surface of said liquid whereby in the absence of said suction means, said supporting means supports said collector member with said inlet above said liquid surface and with said application of said suction means lowers said collector member to a position with said inlet below said liquid surface, said supporting means including a chamber having a top opening, buoyant means for floating said chamber in said liquid and means for connecting said chamber to said suction means source and said collector member comprising a vertical tube having a vertical passageway and slidably engaging said top opening and including a buoyant member located in and restricting said passageway.

5. The apparatus of claim 4, wherein said connecting means includes a flexible conduit communicating with said chamber and a conical hood mounted at the remote end of said flexible conduit.

6. An apparatus for skimming the surface of a liquid comprising a collector member including an inlet and an outlet communicating with said inlet, means for applying suction to said outlet to draw said liquid into said inlet and through said outlet and means for supporting said collector responsive to said suction for varying the elevation of said inlet relative to the surface of said liquid wherein said supporting means in the absence of said suction, supports said collector member with said inlet above said liquid surface and with application of said suction means lowers said collector member to a position with said inlet below said liquid surface and said collector member includes radially spaced inner and outer coaxial walls, said inner wall having a first port formed therein, said support means including a vertical tube slidable telescoping said collector member inner cylindrical wall and having a second port in and out of registry with said first port when said collector member is in its lowered and raised position respectively.

7. The apparatus of claim 6 including a buoyant member positioned in the upper part of said support member vertical tube.

8. An apparatus for skimming the surface of a body of liquid comprising a buoyant collecting member having a vertical cylindrical wall and an upper inlet opening and a lower opening, a cylindrical support member slidably telescopically engaging said cylindrical wall of said buoyant collecting member, a filter receptacle registering with said upper inlet opening, said buoyant collecting member being vertically movably supported by said cylindrical support member and delineating with said cylindrical wall and said filter receptacle a vertically expandable liquid holding chamber, a suction pump having a suction inlet in liquid communication with said vertically expandable liquid holding chamber, a vertical tubular post extending between said suction pump and said cylindrical support member and providing communication means between said suction inlet and said vertically expandable liquid holding chamber, wherein when said suction pump is in the deactivated condition, said buoyant collecting member is buoyantly maintained in a raised position by the liquid in said vertically expandable liquid holding chamber with said upper inlet opening being above a surface of said body of liquid and, upon activation of said suction pump, liquid is withdrawn from said chamber to lower said buoyant collecting member to a position with said upper inlet opening below said surface of said body of liquid.

9. The apparatus of claim 8, wherein said support means includes an annular flotation member surrounding and secured to said cylindrical support member.

10. The apparatus of claim 8, wherein said peripheral wall of said collector means is hollow.

* * * * *